United States Patent
Martin

(10) Patent No.: US 6,739,582 B1
(45) Date of Patent: May 25, 2004

(54) FLEXIBLE CABLE LEADER

(76) Inventor: Terry J. Martin, 39 Courtenay Cir., Pittsford, NY (US) 14534

( * ) Notice: Subject to any disclaimer, the term of this patent is extended or adjusted under 35 U.S.C. 154(b) by 0 days.

(21) Appl. No.: 10/445,407

(22) Filed: May 28, 2003

(51) Int. Cl.[7] ................................ H02G 1/00
(52) U.S. Cl. ............... 254/134.3 FT; 254/134.3 R; 294/19.1; 294/61
(58) Field of Search ............ 254/134.3 R, 134.3 FT, 254/134.3 CL; 24/115 R, 122.6; 294/19.1, 61; 29/278

(56) References Cited

U.S. PATENT DOCUMENTS

| | | | | |
|---|---|---|---|---|
| 714,989 A | * | 12/1902 | Worthington | 294/86.14 |
| 719,907 A | * | 2/1903 | Williamsn | 440/34 |
| 1,208,846 A | * | 12/1916 | Sheldon | 294/86.28 |
| 1,816,446 A | * | 7/1931 | Staff | 294/100 |
| 2,320,967 A | * | 6/1943 | Dunkelberger | 294/100 |
| 4,386,800 A | * | 6/1983 | Stegall | 294/100 |
| 4,432,663 A | * | 2/1984 | Lasak et al. | 403/275 |
| 5,310,294 A | * | 5/1994 | Perkins | 408/226 |
| 6,318,704 B1 | * | 11/2001 | Christenson | 254/134.3 R |

* cited by examiner

Primary Examiner—Joseph J. Hail, III
Assistant Examiner—Daniel Shanley
(74) Attorney, Agent, or Firm—Robert J. Bird

(57) ABSTRACT

A cable leader includes an elongated cylindrical body with a pointed leading end and a hollow tubular end. The tubular end cavity includes an axially tapered inner wall. In one embodiment, the inner wall includes a plurality of axially spaced circumferential bites of progressively decreasing diameter to engage and grip the end of a cable pushed into the tubular end. In another embodiment, the inner wall includes internal threads of progressively decreasing diameter for threading onto the end of a cable.

2 Claims, 2 Drawing Sheets

FLEXIBLE CABLE LEADER

BACKGROUND OF THE INVENTION

This invention is a tool by which to lead flexible cable, such as telephone cable and television cable, through walls, wall space, and insulation.

Installation of telephone cables, television cables, and the like generally requires manipulating a flexible cable through the side of a building. The cable typically has to be fed through an inner wall, outer wall, and a body of insulation between them. In addition, there may be other impediments in the way of the cable making it difficult to feed it through the wall. The main problem is that the cable is not rigid. It is flexible, or even limp, and it is difficult or impossible to push it through walls, insulation, and so on.

It is an object of this invention to provide a simple tool which is effective to lead a flexible cable through a difficult path such as the above-described walls and insulation.

SUMMARY OF THE INVENTION

In summary, this invention is a cable leader, including an elongated cylindrical body with a pointed leading end and a hollow tubular end. The tubular end cavity includes an axially tapered inner wall. In one embodiment, the inner wall includes a plurality of axially spaced circumferential bites of progressively decreasing diameter to engage and grip the end of a cable pushed into the tubular end. In another embodiment, the inner wall includes internal threads of progressively decreasing diameter for threading onto the end of a cable.

DETAILED DESCRIPTION

Figure 1:
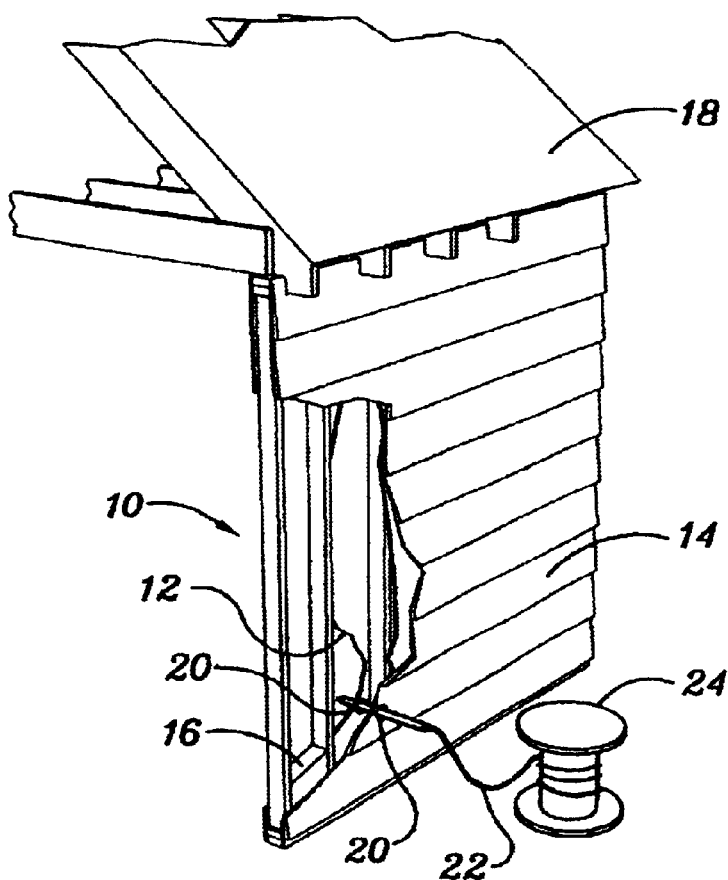
FIG. 1 is a simplified elevation view of part of a wall and roof of a house.

Referring now to the drawing, FIG. 1 illustrates the environment and use ot this invention. The sidewall 10 of a house includes an inner wall 12, outer wall 14, and a body of insulation 16 between the inner and outer walls. A lower portion of roof 18 is shown extending over the top of the sidewall 10. The inner and outer walls 12, 14 include holes 20 through which to bring cable 22 into the house from a spool or reel of cable 24.

Pushing or feeding the cable 22 through the walls 12, 14, insulation 16, and whatever other impediments may be between the walls, is greatly facilitated by the cable leader 26 of this invention.

Figure 2:
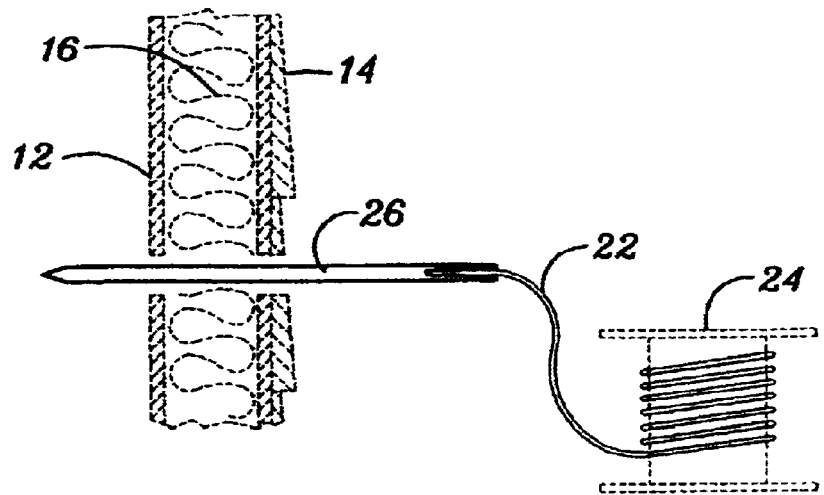
FIG. 2 is an enlarged detail from FIG. 1.
Figure 3:
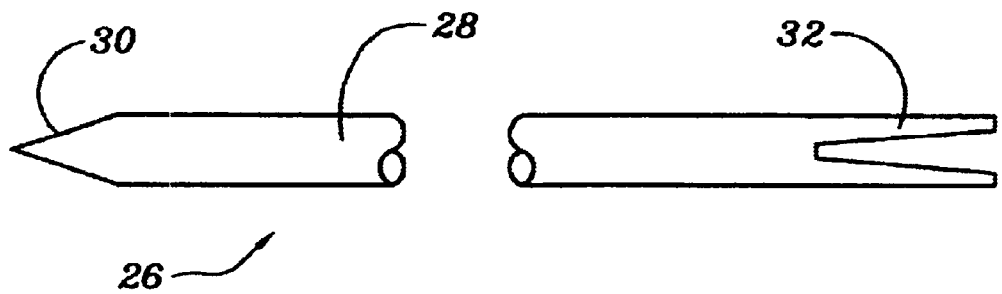
FIG. 3 is a sectional view of the tool of this invention.
Figure 4:
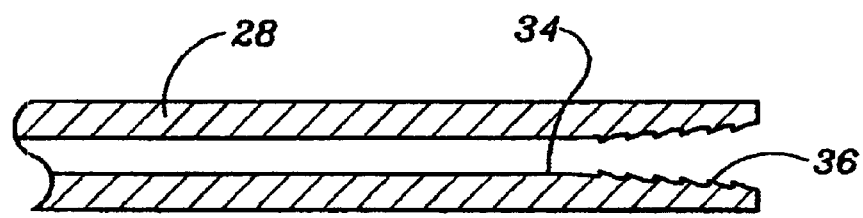
FIG. 4 is an enlarged detail of the right end of FIG. 3 in one form of this invention.

The cable leader 26 is shown enlarged and in greater detail in FIGS. 2, 3, 4. It includes an elongated cylindrical body 28 with a pointed leading end 30 and a hollow tubular end 32. The inside of the tubular end 32 is tapered, being wider open at its open end than at its inside closed end.

In FIG. 4, the tapered inner wall 34 of the tubular end 32 includes a plurality of axially spaced inner circumferential bites 36. The several bites 36 are of different diameters, progressively decreasing as they are deeper into the end tube 32. The cable 22 is covered with a resilient plastic cover. The end of the cable 22 is pushed into the tubular end 32 of the leader 26 until it is gripped by one of the bites 36 to provide a relatively firm connection with which the cable 22 can be pulled through the wall. One or another of the bites 36 engages the cable 22 depending on the diameter of the cable. Thus, the cable leader 26 is usable with different size cables.

Figure 5:
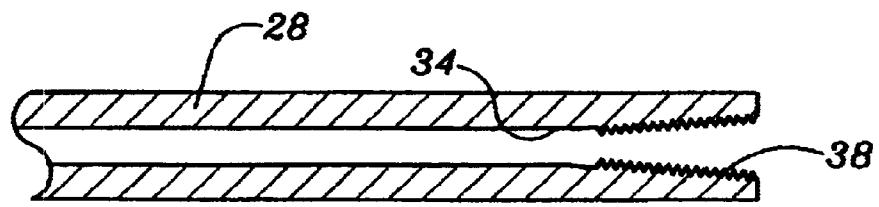
FIG. 5 is similar to FIG. 4, showing another form of this invention.

In FIG. 5, the tapered inner wall 34 of the tubular end 32 includes internal pipe thread 38 with progressively decreasing diameter as it goes deeper into the end tube 32. The tubular end 32 is easily threaded onto the end of the cable 22 to provide a relatively firm connection with which the cable 22 can be pulled through the wall. The tapered thread makes this form of the cable leader also usable with different size cables.

When the cable has been fed into place as desired, the cable is easily disengaged from the cable leader.

The cable leader 26 is long enough to extend all the way through a wall, as shown in FIG. 1. The cable leader is preferably made of metal, such as aluminum, because metal provides a better bite in the tubular end and because a metal tool can stand up better to wear and impact. However, it is contemplated that a hard tough plastic material might also be used.

The foregoing description of a preferred embodiment of this invention sets forth the best mode presently contemplated by the inventor of carrying out this invention. Any details as to materials, quantities, dimensions, and the like are intended as illustrative. The concept and scope of the invention are limited not by the description but only by the following claims and equivalents thereof.

What is claimed is:

1. A cable leader, including an elongated cylindrical body with a pointed leading end and a hollow tubular end;

said tubular end defining an end cavity with an axially tapered inner wall;

said inner wall including a plurality of axially spaced circumferential bites of progressively decreasing diameter;

one or more of said bites effective to engage and grip the end of a cable pushed into said tubular end.

2. A cable leader, including an elongated cylindrical body with a pointed leading end and a hollow tubular end;

said tubular end defining an end cavity with an axially tapered inner wall;

said inner wall including internal threads of progressively decreasing diameter;

whereby said tubular end of said cable leader is adapted to be threaded onto the end of a cable for gripping engagement therewith.

* * * * *